F. MOENCH.
VULCANIZING AND ATTACHING RUBBER.
APPLICATION FILED MAY 27, 1915.
1,157,572.   Patented Oct. 19, 1915.
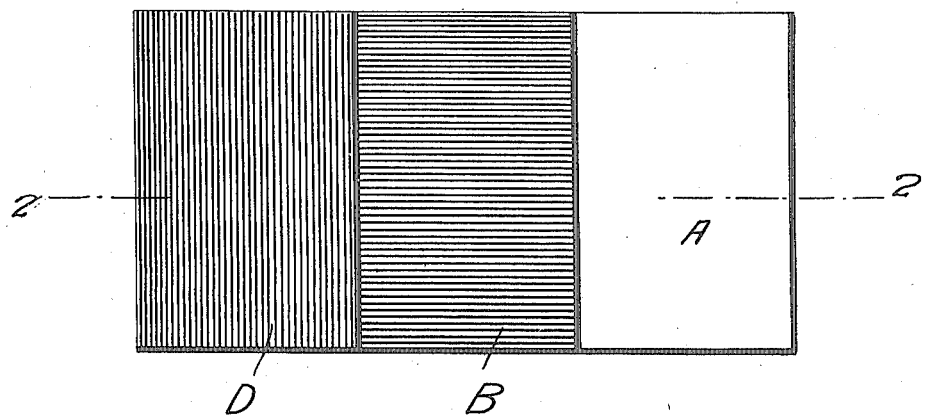
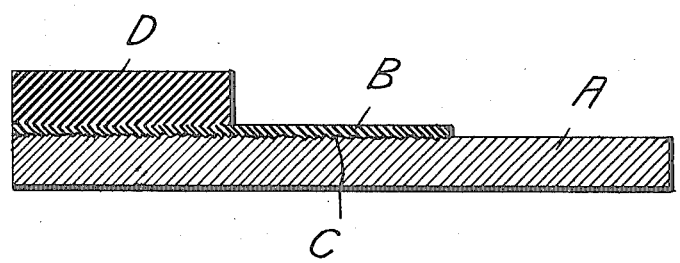
WITNESSES:
Samuel E. Dade.
H. E. Beck
INVENTOR
FREDERICK MOENCH
BY Munn & Co
ATTORNEYS

UNITED STATES PATENT OFFICE.

FREDERICK MOENCH, OF RUSHVILLE, ILLINOIS.

VULCANIZING AND ATTACHING RUBBER.

1,157,572.   Specification of Letters Patent.   Patented Oct. 19, 1915.

Application filed May 27, 1915. Serial No. 30,792.

*To all whom it may concern:*

Be it known that I, FREDERICK MOENCH, a citizen of the United States, and a resident of Rushville, in the county of Schuyler and State of Illinois, have invented a certain new and useful Improvement in Vulcanizing and Attaching Rubber, of which the following is a specification.

My invention relates to improvements in processes for vulcanizing and attaching rubber, and it consists in the various steps hereinafter subscribed.

An object of my invention is to provide a process by means of which rubber may be securely attached to such materials as glass, aluminum, steel, cast iron, tin, porcelain, gold, platinum, and other material.

A further object of my invention is to provide a process of attaching rubber to other materials, and simultaneously vulcanizing the rubber during the attaching process.

A further object of my invention is to provide a process for simultaneously vulcanizing and attaching rubber, which results in securing to a given base a coating of well vulcanized rubber which is securely fastened to the base so as to form substantially an integral part of the base.

Other objects and advantages will appear in the following specification, and the novel features of the invention will be particularly pointed out in the appended claims.

My invention is illustrated in the accompanying drawing forming a part of this application, in which:

Figure 1 is a plan view of an article showing the method of applying the rubber, and Fig. 2 is a section along the line 2—2 of Fig. 1.

The articles to be vulcanized are first cleansed of grease or other dirt. The steel, iron, or aluminum may be washed with hydrofluoric acid and the acid is then quickly removed by a bicarbonate of soda solution. The articles are then washed with clear water and dried at a moderate heat. The dry article is then taken and a thin coat of rubber solution is applied to the article while the latter is preferably held over a heating medium, such as a flame at such a distance as to slightly heat the article.

The rubber solution is preferably made as follows: Good unvulcanized rubber is cut up into small pieces, a portion being dissolved in chloroform, to which an equal bulk of gasolene is added. The mixture should be of very thin consistency. After the mixture thus described is applied to the article, it should be quickly dried. A sharp pointed knife or large needle is now taken and this coating is scratched thoroughly. There will be particles of rubber which will adhere to the article which is to be coated. After the coating has been well scratched, another coat is applied and is dried, and this second coat is scratched in the same manner as the first. More rubber this time will adhere to the article. This operation is repeated until there is a coating of rubber all over the article, and the needle slides through without leaving any perceptible part of the article showing through the scratched places. The article is now dried thoroughly over a gentle heat. A piece of vulcanizable rubber of the desired size and thickness is now warmed over a gentle heat, and at the same time the article should be gently heated. The warm rubber and the warm article are now pressed together firmly. The article with the rubber should now be wrapped loosely in absorbent cotton and placed in a dry vulcanizer. A double boiler may be conveniently used by placing paraffin in the outside vessel and setting the inside vessel which contains the article to be vulcanized into this and heating it to 320° Fahrenheit for one hour. After this heating, the article should be cooled gradually when, on removing it from the vulcanizing vessel, the rubber will be found to be firmly attached to the base. When glass or porcelain is used as a base, the surface may be roughened by carborundum, emery, sand paper, or hot hydrofluoric acid. The acid may be afterward removed by bicarbonate of soda, and then the article may be washed in clear water before applying the rubber mixture.

The process thus described results in the attachment of a rubber coating firmly to the base and at the same time permits the vulcanizing of the rubber.

In Fig. 1, A denotes the base which as stated before, may be one of a number of materials. The primary rubber coating is shown at B. This coating is purposely exaggerated in the drawing. At C I have shown the scratched surface of the base A, while the main body portion of the rubber coating is shown at D. When this is vulcanized, it forms with the coating B, really an integral part.

This process is not to be confused with those which have for their objects the mere cementing of hard rubber or vulcanized rubber to a base of other material. As stated before, the rubber is so firmly attached that it cannot be cleanly cracked off or broken off along the plane of contact with the base as so frequently happens where rubber is cemented to a base. A harder vulcanization may be secured if a small percentage of sulfur is melted and stirred into the chloroform, gasolene, rubber solution. If proper care is used in drying the solution as it is scraped during this process, the use of sulfur is not necessary, in addition to that already contained in the vulcanizable piece before treatment in the vulcanizer.

I claim:

1. The herein described process of attaching rubber to other material which consists in coating said material with a solution of rubber, drying the same, scratching the dried coat into the face of the material to be coated, and applying unvulcanized rubber to the coated material under heat and pressure.

2. The herein described process of attaching rubber to other material, which consists in coating said material with a solution of rubber, drying said coating, scratching the dried coating with a pointed instrument, and applying to the scratched coating unvulcanized rubber under heat and pressure and subsequently relieving the pressure and continuing the heat.

3. The herein described process of simultaneously vulcanizing and attaching rubber to other material, which consists in applying to the material a solution of rubber and allowing the same to dry, scratching the dried coating into the surface or face of the material to be treated, applying unvulcanized rubber to said scratched coating with heat and pressure, and subsequently relieving the pressure and continuing the heat until the rubber is vulcanized.

4. The herein described process of simultaneously vulcanizing and attaching rubber to other material, which consists, in applying to the material a solution of rubber and allowing the same to dry, scratching the dried coating into the surface or face of the material to be treated, applying unvulcanized rubber to said scratched coating with heat and pressure, and subsequently relieving the pressure and continuing the heat at 320° Fahrenheit for one hour.

5. The herein described process of simultaneously vulcanizing and attaching rubber to other material, which consists in giving said material a preliminary coating of rubber dissolved in a mixture of chloroform and gasolene, allowing the coating to dry, scratching the dried coating thoroughly into the face of the material, applying to the scratched coating unvulcanized rubber which is slightly heated, pressing the slightly heated unvulcanized rubber upon the scratched coating, and subsequently heating the rubber coated article for one hour at 320° Fahrenheit until the rubber is well vulcanized and firmly attached to the material.

6. The herein described process of simultaneously vulcanizing and attaching rubber to other material which consists in coating the material with a plurality of coatings made of a solution of rubber dissolved in a mixture of chloroform and gasolene, each coating being dried before the subsequent coating is applied, and each coating being scratched into the face of the material prior to the application of the subsequent coating, then applying unvulcanized rubber slightly heated, pressing the same upon the last scratched coating and finally heating the rubber coated article in a vulcanizer for one hour at 320° Fahrenheit until the rubber has been thoroughly vulcanized.

FREDERICK MOENCH.

Witnesses:
H. H. SPEED,
D. L. MOURNING.